United States Patent
King et al.

(10) Patent No.: US 11,040,462 B2
(45) Date of Patent: Jun. 22, 2021

(54) TREATED POROUS MATERIAL

(71) Applicant: Dow Global Technologies LLC, Midland, MI (US)

(72) Inventors: Stephen W. King, League City, TX (US); Xue Chen, Manvel, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 455 days.

(21) Appl. No.: 15/771,517

(22) PCT Filed: Oct. 26, 2016

(86) PCT No.: PCT/US2016/058743
§ 371 (c)(1),
(2) Date: Apr. 27, 2018

(87) PCT Pub. No.: WO2017/074980
PCT Pub. Date: May 4, 2017

(65) Prior Publication Data
US 2020/0298438 A1    Sep. 24, 2020

Related U.S. Application Data

(60) Provisional application No. 62/246,939, filed on Oct. 27, 2015.

(51) Int. Cl.
*B27K 3/15* (2006.01)
*B27K 3/02* (2006.01)
*C08L 97/02* (2006.01)
*C09D 175/04* (2006.01)
*C08K 5/17* (2006.01)
*C08L 75/04* (2006.01)
*D21H 17/57* (2006.01)

(52) U.S. Cl.
CPC ............ *B27K 3/153* (2013.01); *B27K 3/0278* (2013.01); *C08L 97/02* (2013.01); *C09D 175/04* (2013.01); *B27K 2240/70* (2013.01); *C08K 5/17* (2013.01); *C08L 75/04* (2013.01); *D21H 17/57* (2013.01)

(58) Field of Classification Search
None
See application file for complete search history.

(56) References Cited

U.S. PATENT DOCUMENTS

| 3,778,302 | A | * | 12/1973 | Dahl | C08G 18/10 428/343 |
|---|---|---|---|---|---|
| 5,356,716 | A | | 10/1994 | Patel | |
| 6,183,550 | B1 | * | 2/2001 | Conner | D21H 21/16 106/209.1 |
| 2003/0032720 | A1 | | 2/2003 | Haeberle et al. | |
| 2005/0249884 | A1 | | 11/2005 | Neto et al. | |
| 2006/0240263 | A1 | | 10/2006 | Ashmore et al. | |
| 2012/0301621 | A1 | | 11/2012 | Dombrowski et al. | |
| 2015/0020985 | A1 | * | 1/2015 | Reed | D21H 19/26 162/157.6 |

FOREIGN PATENT DOCUMENTS

| EP | 1277772 A2 | 1/2003 |
|---|---|---|
| EP | 2588517 | 5/2013 |
| GB | 2248237 | 4/1992 |
| RO | 123546 | 7/2013 |
| RO | 123546 B1 | 7/2013 |
| WO | 2006079098 | 7/2006 |
| WO | 2012130765 A1 | 10/2012 |

* cited by examiner

*Primary Examiner* — Dennis R Cordray

(57) ABSTRACT

The present disclosure describes a treated cellulosic material comprising a cellulosic material having a porous structure defining a plurality of pores, at least a portion of the pores containing a treating agent comprising a polymer, the polymer comprising a polyurethane polymer. The present disclosure further describes a method for preparing a treated cellulosic material comprising providing a cellulosic material; and a first treatment protocol comprising impregnating the cellulosic material with an aqueous dispersion comprising a polymer, the polymer comprising a polyurethane polymer; and a second treatment protocol comprising impregnating the cellulosic material with a modifying agent, the modifying agent comprising a hydrophobic amine.

5 Claims, No Drawings

TREATED POROUS MATERIAL

BACKGROUND OF THE INVENTION

Porous materials, such as cellulosic materials, need to be protected from mold growth, insect attack, rot and water impregnation to help preserve the physical properties of the cellulosic material. One example of such a cellulosic material is wood. A variety of treatment agents and preservation methods are known to preserve cellulosic materials.

Modern preservation methods typically involve pressure treating the cellulosic material with a treating agent. Pressure treatment typically allows the treating agent to penetrate throughout the porous structure of the cellulosic material. The treating agent is typically a chemical compound selected to impart the desired physical properties to the cellulosic material. For example, treating agents that add water resistance and improve the dimensional stability of the cellulosic material are of interest. Wood is capable of absorbing as much as 100% of its weight in water which causes the wood to swell, which, after loss of water through evaporation causes the wood to shrink. This process of water absorption/evaporation is non-uniform and creates internal stresses in the wood leading to splitting, warping, bowing, crooking, twisting, cupping, etc. Also, water can serve as a pathway for organisms that degrade the cellulosic material, such as insects or fungus. Treating agents that repel insects, or minimize the formation of fungi/molds, or improve the overall durability of the cellulosic material are of interest. Further, treating agents can improve wind resistance, ultraviolet radiation resistance, stability at high and low temperatures, pest resistance, mold resistance, fire resistance and other issues which might affect the physical properties of the cellulosic material.

An improved treating agent for cellulosic materials is desired.

SUMMARY OF THE INVENTION

The present disclosure describes a treated cellulosic material comprising a cellulosic material having a porous structure defining a plurality of pores, at least a portion of the pores containing a treating agent comprising a polymer, the polymer comprising a polyurethane polymer.

The present disclosure further describes a method for preparing a treated cellulosic material comprising providing a cellulosic material; and a first treatment protocol comprising impregnating the cellulosic material with an aqueous dispersion comprising a polymer, the polymer comprising a polyurethane polymer; and a second treatment protocol comprising impregnating the cellulosic material with a modifying agent, the modifying agent comprising a hydrophobic amine.

DETAILED DESCRIPTION OF THE INVENTION

As used herein, the term "porous material" refers to a material which is permeable such that fluids are movable therethrough by way of pores or other passages. An example of a porous material is a cellulosic material. Other examples of porous materials include stone, concrete, ceramics, and derivatives thereof. As used herein, the term "cellulosic material" refers to a material that includes cellulose as a structural component. Examples of cellulosic materials include wood, paper, textiles, rope, particleboard and other biologic and synthetic materials. As used herein, wood includes solid wood and all wood composite materials (e.g., chipboard, engineered wood products, etc.). Cellulosic materials generally have a porous structure that defines a plurality of pores.

A "treated cellulosic material" is a cellulosic material that has been treated with a treating agent to modify the properties of the cellulosic material. The properties modified by the treating agent include, but are not limited to, increased hydrophobicity, dimensional stability, fungi resistance, mold resistance, insect resistance, hardness, surface appearance, UV stability, fire resistance, and coatability. Increasing the hydrophobicity of a cellulosic material can provide other ancillary benefits, such as dimensional stability, by reducing the rate of water adsorption and evaporation, thus reducing the internal stresses of expanding and contracting.

A "treating agent" is a substance that, when combined with the cellulosic material, modifies the properties of the cellulosic material. In one instance, the treating agent comprises a polymer. In one instance, the treating agent comprises both a polymer and a modifying agent. The treating agent is applied to the cellulosic material. One method of applying the treating agent to the cellulosic material is through impregnation using pressure treatment. In one instance, the treating agent is applied to the cellulosic material as part of a dispersion. Once applied, the treating agent will permeate at least a portion of the pores of the cellulosic material.

As used herein, the term "polymer" refers to a molecule that is formed from one or more types of monomers. The polymer may be a polymer or a copolymer. As used herein, the term "copolymer" may refer to an alternating copolymer, a periodic copolymer, a statistical copolymer, a random copolymer, a block copolymer, a graft copolymer, or other copolymer as is known. As used herein, copolymer refers to a polymer formed by uniting two or more monomers. Examples of copolymers include bipolymers, terpolymers, tetrapolymers, and other higher-ordered copolymers. In one instance, the polymer comprises a polyurethane polymer. In one instance, the polyurethane polymer is a water-dispersible polyurethane. In one instance, the polyurethane polymer contains the acidic or the anionic form of dimethylolpropionic acid. In one instance, the polyurethane polymer is a thermosplastic polyurethane or a thermosetting polyurethane. In one instance, at least a portion of the polyurethane polymer is crosslinked. The polyurethane polymer can be aromatic containing or nonaromatic containing.

In one instance, the polymer is a constituent part of an aqueous dispersion, for example, a polyurethane dispersion (referred to herein as a "PUD"). PUDs comprise water dispersible polyurethane in an aqueous carrier. There are many types of PUD systems including those with thermoplastic water dispersible polyurethanes as well as thermosetting water dispersible polyurethanes with cross-linkable polyurethane particles (either two-component systems or one-component systems with latent crosslinking moieties in the particles). The present invention, in its broadest scope, is not limited to a particular type of water dispersible polyurethane. Thermosetting polymer binders are crosslinked and so tend to produce less flexible articles than thermoplastic polymer binders, particularly at high levels of crosslinking. Crosslinking can occur before, during or after drying of the PUD by known methods including UV curing and use of chemical crosslinking agents. An example of a suitable crosslinking agent is 1,2 propanediamine. The water dispersible polyurethane can be anionic to facilitate aqueous dispersibility. In one instance the dispersion includes a solvent. In one instance the solvent contains water. In one instance the solvent is an organic solvent. In one instance the organic solvent is an oxygenated solvent, a hydrocarbon solvent, a halogenated solvent, or a combination thereof. In one instance, the PUD has a solid concentration of from 1 to 70 weight percent. In one instance, the PUD has a solid concentration of from 5 to 50 weight percent. In one instance, the PUD has a solid concentration of from 10 to 35 weight percent.

In one instance the pores of the cellulosic material contain a polyurethane polymer and a modifying agent. The "modifying agent" is a substance that, when combined with the polymer modifies the properties of the cellulosic material. The modifying agent may modify the cellulosic material in a variety of ways, for example, by increasing the hydrophobicity of the cellulosic material. In one instance, the modifying agent is a hydrophobic amine, for example, a primary, a secondary or a tertiary amine. In one instance, the modifying agent is a hydrophobic amine salt. In one instance the hydrophobic amine contains only one amino group. The hydrophobic amine may be any suitable amine, such as a linear amine, a branched aliphatic amine, a cyclic amine, an aromatic amine, or a mixture thereof. The amine is selected such that the viscosity is low enough to penetrate the pores of the cellulosic material and contains six or more carbon atoms to provide sufficient hydrophobicity. In the case of highly viscous amines or solid amines, a solvent may be used, for example, water, oxygenated solvents, halogenated solvents, aromatic solvents, hydrocarbons, or a mixture thereof. Examples of hydrophobic amines include N-methyl N-hexyl amine, N,N-diethyl n-hexylamine, n-octyl amine, n-decyl amine, n-dodecyl amine, N-methyl cyclohexylamine, N,N,-diethyl cyclohexylamine, dicyclohexylamine, benzyl amine, coco amine, oleyl amine, stearyl amine, and the N, N-dimethyl substituted fatty amines. In one example, the modifying agent is phenethylamine or tallow amine.

The treating agent and the modifying agent are each introduced to the cellulosic material. In one instance, the treating agent and the modifying agent are each introduced to the cellulosic material by pressure treatment, as described herein. The treating agent and the modifying agent become impregnated in at least a portion of the pores of the cellulosic material, and thereby increases the weight of the cellulosic material. In one instance, the weight of the cellulosic material increases by 1 to 80 percent (as calculated after drying the cellulosic material for at least 2 hours at or above 60° C.). In one instance, the weight of the cellulosic material increases by 5 to greater than 100 percent (as calculated after drying the cellulosic material for at least 2 hours at or above 60° C.).

In one instance, the cellulosic material contains one or more additives. The additive may be included as part of the treating agent, as part of the modifying agent, or may be included separately therefrom. Additives which are known to add properties to treated cellulosic materials are suitable, such as, flame retardants, dispersants and/or dyes. For example, the additives may be organic compounds, metallic compounds, or organometallic compounds. In one instance, the additive is a material which improves the wetting or penetration of the polymer into the wood, for example, solvents or surfactants (anionic, cationic or nonionic) that are stable in the dispersion. Examples of additives include solvents, fillers, thickeners, emulsifiers, dispersing agents, buffers, pigments, penetrants, antistatic agents, odor substances, corrosion inhibitors, preservatives, siliconizing agents, rheology modifiers, anti-settling agents, anti-oxidants, other crosslinkers (e.g. diols and polyols), optical brighteners, waxes, coalescence agents, biocides and antifoaming agents. Such waxes may include petroleum waxes, paraffin waxes, a natural wax, or a synthetic wax such as polyethylene wax or oxidized polyethylene wax, beeswax, or slack wax. In addition, the treating agent may be used in conjunction with wood preservatives containing, for example, cupric-ammonia, cupric-amine, cupric-ammonia-amine complexes, quaternary ammonium compounds, or other systems. For example, the treating agent may be used with Alkaline Copper-Quaternary ammonium (ACQ) preservative systems. The treating agent may also be used with wood preservative technologies which use zinc salts or boron containing compounds. Optionally, other additives such as insecticides, termiticides, fungicides, and moldicides may be added to the treating agent. In one instance, the additive is included as part of the dispersion and forms a stable suspension therewith. In one instance, one or more surfactant is added to the dispersion. In one instance, a surfactant is selected which reduces gelling of the polymer at the surface of the cellulosic material. In one instance, a surfactant is selected which increases the amount of polymer impregnated in the cellulosic material. For example, suitable surfactants may be nonionic, anionic, or cationic. Examples of nonionic surfactants include: alkoxylated alcohols, alkoxylated alkyl phenols, fatty acid esters, amine and amide derivatives, alkylpolyglucosides, ethylene oxide/propylene oxide copolymers, polyols and alkoxylated polyols. For example, a nonionic surfactant is TERGITOL™ L-62, commercially available from The Dow Chemical Company. Examples of anionic surfactants include: alkyl sulfates, alkyether sulfates, sulfated alkanolamides, alpha olefin sulfonates, lignosulfonates, sulfosuccinates, fatty acid salts, and phosphate esters. For example, an anionic surfactant is DOWFAX™ C10L, commercially available from The Dow Chemical Company. Examples of cationic surfactants include alkyltrimethylammonium salts.

In one instance, the cellulosic material is prepared as a treated cellulosic material by pressure treatment. The pressure used to pressure treat the cellulosic material may be either higher or lower than atmospheric pressure. In one instance, the pressure is lower than ambient pressure, for example, 0.0001 to 0.09 MPa (0.75 to 675 mmHg). In another instance, the pressure is greater than ambient pressure, for example, 0.1 to 1.7 MPa (750 to 12750 mmHg). It is envisioned that pressure treatment processes known in the art are suitable for impregnating the cellulosic material with the treating agent.

In one instance, the treated cellulosic material is prepared according to at least a first treatment protocol and a second treatment protocol. In one instance, the first treatment protocol comprises impregnating the cellulosic material with the polymer. The first treatment protocol comprises one or more of the following steps: (a) depositing the cellulosic material in a vessel; (b) holding the vessel at vacuum for 5 to 60 minutes; (c) introducing a polymer to the vessel; (d) pressurizing the vessel to 1.03 MPa for 5 to 60 minutes; (e) draining the excess polymer; (f) optionally removing excess polymer by vacuum and (g) drying the cellulosic material at 20 to 60° C. for 24 to 48 hours. In one instance, the polymer is part of the aqueous dispersion.

In one instance, the product of the first treatment protocol is subsequently prepared according to a second treatment protocol that impregnates the cellulosic material with the modifying agent. The second treatment protocol comprises one or more of the following steps: (a) depositing the cellulosic material prepared according to the first treatment protocol in a vessel; (b) introducing the modifying agent to the vessel; (c) holding the vessel at either vacuum or increased pressure for 5 to 60 minutes; (d) optionally removing excess modifying agent by vacuum; and (e) drying the cellulosic material at 20 to 60° C. for 24 to 48 hours. In one instance, the modifying agent comprises a hydrophobic amine.

The designations "first treatment protocol" and "second treatment protocol" are not meant to be read as defining a treatment order. It is envisioned that the cellulosic material may be treated first with the aqueous dispersion and second treated with the modifying agent, whereby the second treatment follows the first treatment in time. It is also envisioned that the cellulosic material may be treated first with the modifying agent and second treated with the dispersion, whereby the second treatment protocol precedes the first treatment protocol in time. In the preferred embodiment, the first treatment protocol precedes the second treatment protocol.

The several drying steps may be performed at a range of temperatures, whereby the duration of the drying step is proportional to the temperature. Suitable drying temperatures are between room temperature (roughly 20° C.) and 180° C. The drying may be performed in air, in nitrogen, or other suitable atmosphere.

A water immersion test is used to determine the water repellency of the treated cellulosic material according to the American Wood Protection Association Standard E4-11 procedure (Standard Method of Testing Water Repellency of Pressure Treated Wood). The water immersion test involves first, providing both a treated wafer, comprising a treated cellulosic material prepared as described herein, and a control wafer, comprising an untreated cellulosic material; second, measuring the tangential dimension of both the treated wafer and the control wafer to provide an initial tangential dimension ($T_1$) (where the tangential dimension is perpendicular to the direction of the grain of the cellulosic material); third, placing both the treated wafer and the control wafer in a conditioning chamber maintained at 65±3% relative humidity and 21±3° C. until a constant weight is achieved; fourth, immersing both the treated wafer and the control wafer in distilled water at 24±3° C. for 30 minutes; and fourth, measuring the tangential dimension of both the treated wafer and the control wafer following removal from the water to provide a post tangential dimension ($T_2$).

The percent swelling (S) for each individual wafer (both the treated wafer and the control wafer) is calculated as:

$$S\ (\%) = \frac{T_2 - T_1}{T_1} \times 100$$

In each of the Examples herein, the percent swelling of the control wafer is 4.7%.

Water-repellency efficiency (WRE) is used to determine the effectiveness of the treating agent in adding water repellant properties to the treated cellulosic material. WRE is calculated as:

$$WRE\ (\%) = \frac{S_1 - S_2}{S_1} \times 100$$

$S_1$ refers to the percent swelling of the untreated wafer; $S_2$ refers to the percent swelling of the treated wafer. According to E4-11, for most outdoor applications a minimum WRE of 75% is preferred. The WRE of the control untreated wood is 0%.

The hardness of the treated cellulosic material is determined according to the Shore (Durometer) test using a Type D Durometer (30° cone, 1.40 mm diameter, 2.54 mm extension, 44.48N spring force). Hardness is determined using the Type D Durometer by placing the cellulosic material on a hard flat surface, and the foot of the durometer is pressed with the given spring force against the cellulosic material. The hardness value is recorded from the gauge on the Durometer within one second of contact with the cellulosic material. At least five hardness tests were performed per sample of cellulosic material. Hardness values reported herein are averages of the tests performed for a given cellulosic material. The hardness value of an untreated southern yellow pine control wafer is approximately 40.

The following Examples illustrate certain aspects of the present disclosure, but the scope of the present disclosure is not limited to the following Examples.

All the vacuum operations in the examples are in the range of −0.00399 MPa to −0.00267 MPa.

EXAMPLES

Two treating agents are prepared as described here. The first treating agent is prepared using PRIMAL Binder™ U51, available from the Dow Chemical Company (PUD 1). The second treating agent is prepared using PRIMAL Binder™ U91, available from the Dow Chemical Company (PUD 2). Each treating agent is prepared by diluting the respective PRIMAL Binder with deionized water to achieve 17.5 weight percent solids.

Seven wood blocks are provided (4 cm*2 cm*0.5 cm), and identified as A, B, C, D, E, F and G.

Block A is a control and is not subjected to a treatment protocol. Blocks B, C, D and E are each treated by a pressure treatment protocol. Each of the blocks is pressed down by a ring and evacuated in a parr reactor for half an hour followed by drawing in 80 ml of the Treating Agent identified in Table 1. The reactor is pressurized to 1.03 MPa under nitrogen and maintained for 60 min, thereby impregnating the blocks with the treating agent. The blocks are then optionally treated with a modifying agent, phenylethylamine (PEA, obtained from Sigma Aldrich), as identified in Table 1. During the post treating step using PEA, the block is pressed down by a ring and evacuated in a parr reactor for half an hour followed by drawing in 80 ml of PEA. The impregnated wood is then placed in an oven with air drying at 60 C for 48 h and ready for dimensional stability test.

Blocks F and G are treated by a coating treatment protocol. For a coating treatment, each of the blocks is dipped in the treating agent identified in Table 1 for 2 minutes to provide an even coating over the surface of each block. The blocks are then air dried overnight.

The dimensional stability of each of the blocks is measured according to the E4-11 procedure described herein, with results provided in Table 1. As shown in Table 1, pressure treatment provides significantly improved WRE as compared to coating. The results also show that treating with both a treating agent and a modifying agent provides an improved WRE as compared to treating with the treating agent alone.

TABLE 1

| Block | Treating Agent | Modifying Agent | Treatment Protocol | WRE | Percent Swelling | Weight gain |
|---|---|---|---|---|---|---|
| A | — | — | — | 0.00% | 4.7% | — |
| B | PUD 1 | — | Pressure | 38.35% | 2.9% | 22.0% |
| C | PUD 1 | PEA | Pressure | 84.26% | 0.07% | 31.4% |
| D | PUD 2 | — | Pressure | 57.41% | 2.0% | 21.8% |
| E | PUD 2 | PEA | Pressure | 75.56% | 1.15% | 31.1% |
| F | PUD 1 | — | Coating | 22.8% | 2.3% | 8.7% |
| G | PUD 2 | — | Coating | 13.5% | 2.5% | 12.5% |

What is claimed is:

1. A method for preparing a treated cellulosic material comprising:

(a) providing a cellulosic material; and (b) a first treatment protocol comprising impregnating the cellulosic material with an aqueous dispersion comprising a polymer, the polymer comprising a polyurethane polymer; and (c) a second treatment protocol comprising impregnating the cellulosic material with a modifying agent, the modifying agent comprising a hydrophobic amine.

2. The method of claim 1, wherein the impregnating of the first and second treatment protocols is conducted under pressure greater than or lower than ambient.

3. The method of claim 1, wherein the polyurethane polymer comprises a water-dispersible polyurethane.

4. The treated cellulosic material of claim 2, wherein the water-dispersible polyurethane comprises the acidic or anionic form of dimethylolpropionic acid.

5. The treated cellulosic material of claim 3, wherein the water-dispersible polyurethane comprises a thermoplastic polyurethane or a thermosetting polyurethane.

* * * * *